United States Patent
Kim et al.

(10) Patent No.: US 9,686,748 B2
(45) Date of Patent: Jun. 20, 2017

(54) METHOD AND APPARATUS FOR CONTROLLING POWER OF TERMINAL

(71) Applicant: Samsung Electronics Co., Ltd., Suwon-si, Gyeonggi-do (KR)

(72) Inventors: Do-Young Kim, Yongin-si (KR); Dong-Keon Kong, Suwon-si (KR); Hyeon-Cheol Pu, Suwon-si (KR); Nae-Hyun Lim, Seoul (KR); Hyoung-Kyu Lim, Seoul (KR); Yong Chang, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 74 days.

(21) Appl. No.: 14/369,955

(22) PCT Filed: Dec. 20, 2012

(86) PCT No.: PCT/KR2012/011190
§ 371 (c)(1),
(2) Date: Jun. 30, 2014

(87) PCT Pub. No.: WO2013/100487
PCT Pub. Date: Jul. 4, 2013

(65) Prior Publication Data
US 2014/0364175 A1    Dec. 11, 2014

(30) Foreign Application Priority Data
Dec. 29, 2011    (KR) .......................... 10-2011-0146042

(51) Int. Cl.
*H04M 1/00*    (2006.01)
*G08B 5/22*    (2006.01)
(Continued)

(52) U.S. Cl.
CPC ........ *H04W 52/027* (2013.01); *G06F 1/3209* (2013.01); *G06F 1/3265* (2013.01);
(Continued)

(58) Field of Classification Search
CPC ............ G06Q 30/0282; G06Q 30/0281; G06F 19/3406; G06F 19/3418; G06F 19/322
See application file for complete search history.

(56) References Cited

U.S. PATENT DOCUMENTS

2004/0033783 A1* 2/2004 Hans ................. H04M 1/72519
455/73
2004/0083301 A1* 4/2004 Murase .............. H04N 7/17318
709/231
(Continued)

FOREIGN PATENT DOCUMENTS

KR    1995-0027600 A    10/1995
KR    2001-0027810 A    4/2001
(Continued)

*Primary Examiner* — Tammy Paige Goddard
*Assistant Examiner* — Frantz Bataille
(74) *Attorney, Agent, or Firm* — Jefferson IP Law, LLP (57) ABSTRACT

A terminal communicating with at least one wireless communication device determines whether a first data is received from the at least one wireless communication device in a first mode, in which power is supplied to a display portion, determines whether a second data is received during a first time period from the time when the first data is received, and switches to a second mode in which the power supplied to the display portion is blocked according to whether the second data is received.

6 Claims, 10 Drawing Sheets

(51) Int. Cl.
    *G06F 1/24*           (2006.01)
    *H04W 52/02*        (2009.01)
    *H04N 21/443*       (2011.01)
    *H04L 29/08*         (2006.01)
    *G06F 1/32*           (2006.01)
    *H04N 5/63*           (2006.01)

(52) U.S. Cl.
    CPC ...... G06F 1/3287 (2013.01); H04L 29/08801 (2013.01); H04N 21/4436 (2013.01); *G09G 2330/00* (2013.01); *H04N 5/63* (2013.01); *Y02B 60/1242* (2013.01); *Y02B 60/1282* (2013.01); *Y02B 60/50* (2013.01)

(56) References Cited

U.S. PATENT DOCUMENTS

| | | |
|---|---|---|
| 2006/0142968 A1 | 6/2006 | Han et al. |
| 2006/0271984 A1 | 11/2006 | Ishihara |
| 2007/0075829 A1* | 4/2007 | Cheng ............... G06F 1/3203 340/7.1 |
| 2007/0141981 A1* | 6/2007 | Choi ................... H04H 20/61 455/3.06 |
| 2007/0152994 A1 | 7/2007 | Koh |
| 2009/0307575 A1* | 12/2009 | Minami ............... G11B 27/105 715/209 |
| 2010/0042827 A1* | 2/2010 | Pratt .................. G06F 1/3203 713/100 |
| 2010/0050006 A1 | 2/2010 | Nishibayashi et al. |
| 2010/0079432 A1 | 4/2010 | Kang et al. |
| 2010/0145872 A1* | 6/2010 | Chae ................ G06Q 30/0282 705/346 |
| 2010/0161352 A1 | 6/2010 | Lim et al. |
| 2011/0109809 A1 | 5/2011 | Dai |

FOREIGN PATENT DOCUMENTS

| | | |
|---|---|---|
| KR | 2002-0005307 A | 1/2002 |
| KR | 2002-0037147 A | 5/2002 |
| KR | 2002-0041575 A | 6/2002 |
| KR | 2002-0042080 A | 6/2002 |
| KR | 2003-0015651 A | 2/2003 |
| KR | 2003-0092952 A | 12/2003 |
| KR | 2004-0060468 A | 7/2004 |
| KR | 2005-0000735 A | 1/2005 |
| KR | 2005-0097419 A | 10/2005 |
| KR | 2005-0098543 A | 10/2005 |
| KR | 2005-0122677 A | 12/2005 |
| KR | 2006-0024607 A | 3/2006 |
| KR | 10-0570342 B1 | 4/2006 |
| KR | 2006-0035105 A | 4/2006 |
| KR | 2006-0035490 A | 4/2006 |
| KR | 2006-0037100 A | 5/2006 |
| KR | 2006-0053510 | 5/2006 |
| KR | 2006-0076829 A | 7/2006 |
| KR | 2007-0020952 A | 2/2007 |
| KR | 10-0727770 B | 6/2007 |
| KR | 2007-0073463 A | 7/2007 |
| KR | 2009-0052786 A | 5/2009 |
| KR | 10-0914039 B1 | 8/2009 |
| KR | 2009-0127480 A | 12/2009 |
| KR | 2010-0008384 A | 1/2010 |
| KR | 10-0955640 B1 | 4/2010 |
| KR | 2010-0035044 A | 4/2010 |
| KR | 2010-0035428 A | 4/2010 |
| KR | 2010-0037345 A | 4/2010 |
| KR | 2010-0048753 A | 5/2010 |
| KR | 2010-0066351 A | 6/2010 |
| KR | 2010-0073027 A | 7/2010 |
| KR | 2011-0061399 A | 6/2011 |
| KR | 2011-0065927 A | 6/2011 |
| KR | 2011-0069358 A | 6/2011 |
| WO | 01-19237 A1 | 3/2001 |
| WO | 03/096693 A1 | 11/2003 |

* cited by examiner

METHOD AND APPARATUS FOR CONTROLLING POWER OF TERMINAL

CROSS-REFERENCE TO RELATED APPLICATION(S)

This application is a U.S. National Stage application under 35 U.S.C. §371 of an International application filed on Dec. 20, 2012 and assigned application number PCT/KR2012/011190, which claimed the benefit of a Korean patent application filed on Dec. 29, 2011 in the Korean Intellectual Property Office and assigned Serial number 10-2011-0146042, the entire disclosure of which is hereby incorporated by reference.

TECHNICAL FIELD

The present disclosure relates to a method and apparatus for controlling power of a terminal.

BACKGROUND

As wireless communication technologies have advanced, terminals such as Televisions (TVs) and mobile phones have provided various services using communication with wireless communication devices (for example, Bluetooth, Wireless Fidelity (WiFi), Zigbee, and the like). Thus, the terminals determine whether data is received from the wireless communication device and if the data is received, the terminals provide a service using the received data to users.

However, the wireless communication device sporadically transmits data without predetermined rules, such that the terminal needs to monitor at all times whether data is received from the wireless communication device. In particular, although displaying occupies the most part of power consumption of the terminal, conventionally, the terminal receives data from the wireless communication device and displays the received data while turning on the display at all times.

As such, the conventional terminal unnecessarily consumes power due to the use of a service. Moreover, during the use of the terminal, data of the wireless communication device is frequently displayed, disturbing the user's use of the terminal. Hence, a need exists for a scheme for saving power by effectively solving a problem caused by the display of the terminal communicating with the wireless communication device.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and apparatus for controlling power of a terminal.

Another aspect of the present disclosure is to provide a method and apparatus for reducing power consumption by effectively controlling a display of a terminal.

Another aspect of the present disclosure is to provide a method and apparatus for efficiently providing a service corresponding to communication with at least one wireless communication device, without wasting power.

In accordance with an embodiment of the present disclosure, a method for controlling power by a terminal that communicates with at least one wireless communication device is provided. The method includes determining whether first data is received from the at least one wireless communication device in a first mode in which power is supplied to a display unit, determining whether second data is received during a first time period from reception of the first data, and switching to a second mode in which the power to the display unit is cut off according to whether the second data is received.

In accordance with another embodiment of the present disclosure, a method for controlling power by a terminal that communicates with at least one wireless communication device is provided. The method includes determining whether first data is received from the at least one wireless communication device in a first mode in which power is supplied to a display unit, displaying information corresponding to the first data on the display unit, if the first data is received, determining whether a first time period has elapsed from start of the first mode, and switching to a second mode in which the power to the display unit is cut off according to whether the first time period has elapsed.

In accordance with another embodiment of the present disclosure, a method for controlling power by a terminal that communicates with at least one wireless communication device is provided. The method includes measuring a time period taken to receive data from the at least one wireless communication device and to display information corresponding to the received data, displaying information about the measured time and receiving an input of a time from a user, transmitting information about the input time to the at least one wireless communication device, and receiving data from the at least one wireless communication device during the input time and displaying information corresponding to the received data.

In accordance with another embodiment of the present disclosure, a terminal that communicates with at least one wireless communication device is provided. The terminal includes a Radio Frequency (RF) unit configured to receive data from the at least one wireless communication device, a display unit configured to display information corresponding to the received data, and a controller configured to determine whether first data is received from the at least one wireless communication device in a first mode in which power is supplied to the display unit, determine whether second data is received during a first time period from reception of the first data, and switch to a second mode in which the power to the display unit is cut off according to whether the second data is received.

In accordance with another embodiment of the present disclosure a terminal that communicates with at least one wireless communication device is provided. The terminal includes an RF unit configured to receive data from the at least one wireless communication device, a display unit configured to display the received data, and a controller configured to determine whether first data is received from the at least one wireless communication device in a first mode in which power is supplied to the display unit, to display information corresponding to the first data on the display unit if the first data is received, to determine whether a first time period has elapsed from start of the first mode, and to switch to a second mode in which the power to the display unit is cut off according to whether the first time period has elapsed.

In accordance with another embodiment of the present disclosure, a terminal that communicates with at least one wireless communication device is provided. The terminal includes an RF unit configured to receive data from the at least one wireless communication device, a display unit configured to display information corresponding to the received data, and a controller configured to measure a time period, which is taken to receive data from the at least one wireless communication device and to display information corresponding to the received data, and to display information about the measured time and receive an input of a time from a user, to transmit information about the input time to the at least one wireless communication device, and to receive data from the at least one wireless communication device during the input time and display information corresponding to the received data.

According to the present disclosure, a display of a terminal may be effectively controlled to reduce power consumption. In the present disclosure, the terminal may efficiently provide a service corresponding to communication with at least one wireless communication device without wasting power.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The present disclosure proposes a method and apparatus for controlling power of a terminal. More specifically, the present disclosure proposes a method and apparatus for reducing power consumption by effectively controlling a display when a terminal provides a service by communicating with at least one wireless communication device. The terminal provides various services to a user by communicating with the at least one wireless communication device.

To help with the understanding of the present disclosure, in an embodiment of the present disclosure, it is assumed that the terminal is a Television (TV) and the terminal provides a health care service by communicating with the at least one wireless communication device. However, the method and apparatus according to an embodiment of the present disclosure may be used for services other than the health care service, and the terminal may be a mobile phone equipped with a display, a Personal Digital Assistant (PDA), a laptop computer, or the like as well as the TV, as will be obvious to those of ordinary skill in the art.

Hereinafter, a structure of a system for providing a health care service according to an embodiment of the present disclosure will be described with reference to FIG. 1.

Figure 1:
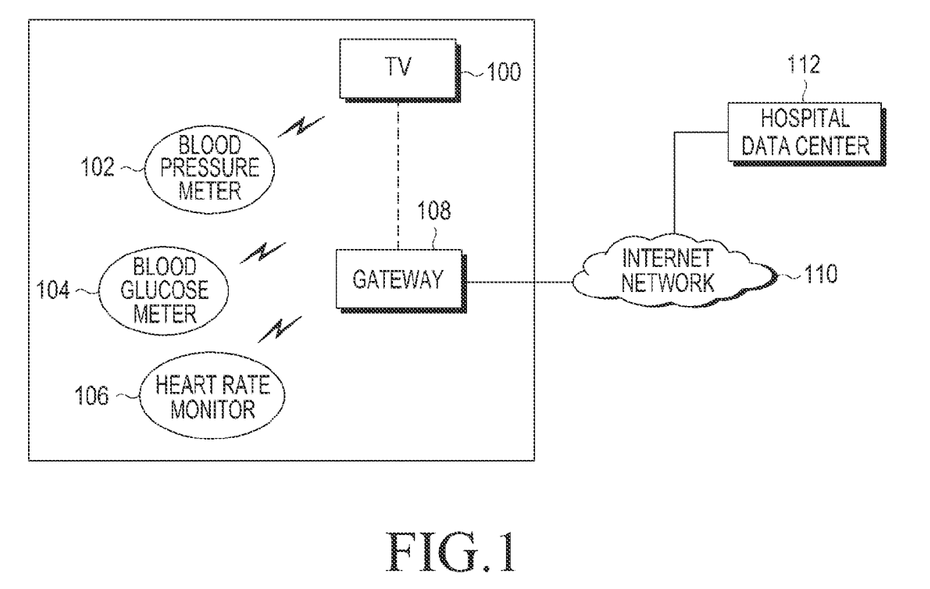
FIG. 1 illustrates a system for providing a health care service according to an embodiment of the present disclosure.

FIG. 1 illustrates a system for providing a health care service according to an embodiment of the present disclosure.

Referring to FIG. 1, the system may include a TV 100 and at least one wireless communication device (for example, a blood pressure meter 102, a blood glucose meter 104, and a heart rate monitor 106) that performs wireless communication with the TV 100. The blood pressure meter 102, the blood glucose meter 104, and the heart rate monitor 106 communicate with the TV 100 through Bluetooth, Wireless Fidelity (WiFi), and Zigbee.

In the health care service, once the blood pressure meter 102, the blood glucose meter 104, and the heart rate monitor 106 transmit corresponding data (for example, a blood pressure, a blood glucose level, a weight, and a heart rate) to the TV 100, the TV 100 displays information corresponding to the data on a screen to provide the information to the user. The health care service transmits the corresponding data to a hospital data center 112 by using an Internet network 110 via a gateway 108, allowing the user to receive medical treatment.

Conventionally, if data is generated in a wireless communication device such as the blood pressure meter 102, the blood glucose meter 104, or the heart rate monitor 106, the user may check the data generated in the wireless communication device when the TV 100 is powered on. Thus, even when not desiring to watch the TV 100, the user has to power on the TV 100 to check the data generated in the wireless communication device. Moreover, all the internal components of the TV 100 have to operate to check the data, unnecessarily consuming the power of the TV 100. Even when the user is watching the TV 100, data is sporadically transmitted for each wireless communication device and thus the data is frequently displayed, degrading the effect of TV watching. Therefore, an embodiment of the present disclosure proposes a method and apparatus for efficiently controlling power of the TV 100.

Figure 2:
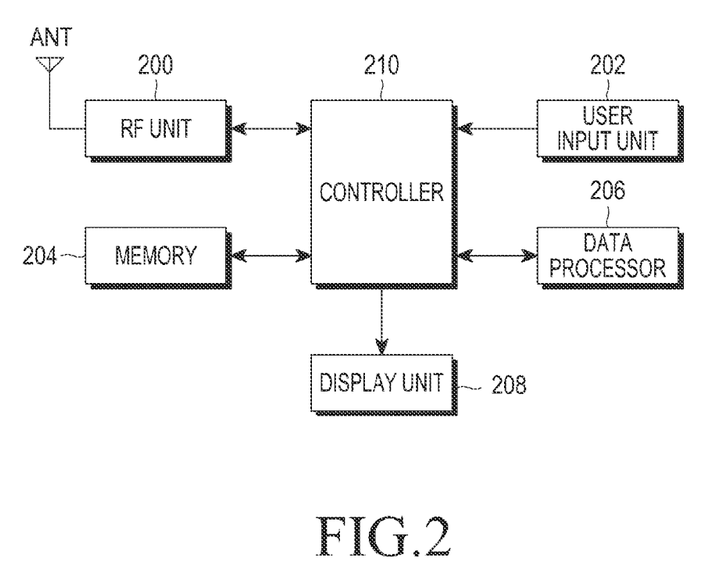
FIG. 2 is a block diagram of a Television (TV) according to an embodiment of the present disclosure.

With reference to FIG. 2, a description will be made of an internal structure of the TV according to an embodiment of the present disclosure.

FIG. 2 is a block diagram of a Television (TV) according to an embodiment of the present disclosure.

Referring to FIG. 2, the TV may include a Radio Frequency (RF) unit 200, a user input unit 202, a memory 204, a data processor 206, a display unit 208, and a controller 210.

The RF unit 200 communicates with at least one wireless communication device, and may include a communication module for communication such as Bluetooth, WiFi, Zigbee, and the like.

The user input unit 202 receives an input from the user and receives a user's input for turning on/off the TV, selecting a channel, or selecting other services. The user input unit 202 may be omitted if the display unit 206 is a touch screen.

The memory 204 stores a variety of data generated during an operation of the TV. The memory 204 may include a buffer that stores the data received from the at least one wireless communication device and temporarily stores data.

The data processor 206 arithmetic-logically processes or calculates the data stored in the memory 204. The data processor 206 generates the data stored in the memory 204 as information corresponding to a service used by the user, and may be, for example, a Central Processing Unit (CPU).

The display unit 208 displays the data processed in the data processor 206 on a screen, and may include a Liquid Crystal Display (LCD) monitor or a touch screen.

The controller 210 controls the RF unit 200, the user input unit 202, the memory 204, the data processor 206, and the display unit 208 to control the overall operation of the TV. In particular, the controller 210 controls the RF unit 200, the memory 204, the data processor 206, and the display unit 208 to operate in one of four modes provided in Table 1 according to an embodiment of the present disclosure.

TABLE 1

| | Data Processor 206 | Display Unit 208 | RF Unit 200 | Memory 204 |
|---|---|---|---|---|
| Off Mode | x | X | x | x |
| On Mode | ○ | ○ | ○ | ○ |
| Service Mode (e.g., Health Mode) | ○/x | ○/x | ○ | ○ |
| Dual Mode | ○ | ○ | ○ | ○ |

Referring to Table 1, the off mode is a mode in which the TV is powered off and power supplied to components of the TV, except for the user input 202, is cut off. The on mode is a mode in which the TV is powered on and power is supplied to all the components of the TV. The off mode and the on mode are used to terminate or trigger general operations of the TV such as channel search or broadcasting program display.

The service mode is a mode in which a service (for example, a health care service) corresponding to communication with at least one wireless communication device is provided and, in this mode, power is continuously supplied to the RF unit 200 and the memory 204 and power is supplied to the display unit 208 and the data processor 206 or is cut off by using a method according to an embodiment of the present disclosure. A power control operation in the service mode will be described in more detail.

The dual mode is a mode in which the user may use service data when the user is watching the TV. For example, if blood pressure information measured by a blood pressure meter is transmitted to the TV in the dual mode, the blood pressure information is displayed on the display unit 208 when the user is watching the TV.

In the TV, one of the four modes provided in Table 1 is used based on user's selection. In the service mode, considering the number of wireless communication devices that perform wireless communication with the TV, the following power control scheme may be used for the TV.

The power control scheme for the TV proposed in an embodiment of the present disclosure includes a periodic power control scheme, an adaptive power control scheme, and a cooperative power control scheme. If the number of wireless communication devices that perform communication with the TV is 1, the periodic power control scheme may be used. For two or more wireless communication devices, the adaptive power control scheme and the cooperative power control scheme may be used.

The three power control schemes will be described in detail.

First, the periodic power control scheme will be described with reference to FIG. 3.

Figure 3:
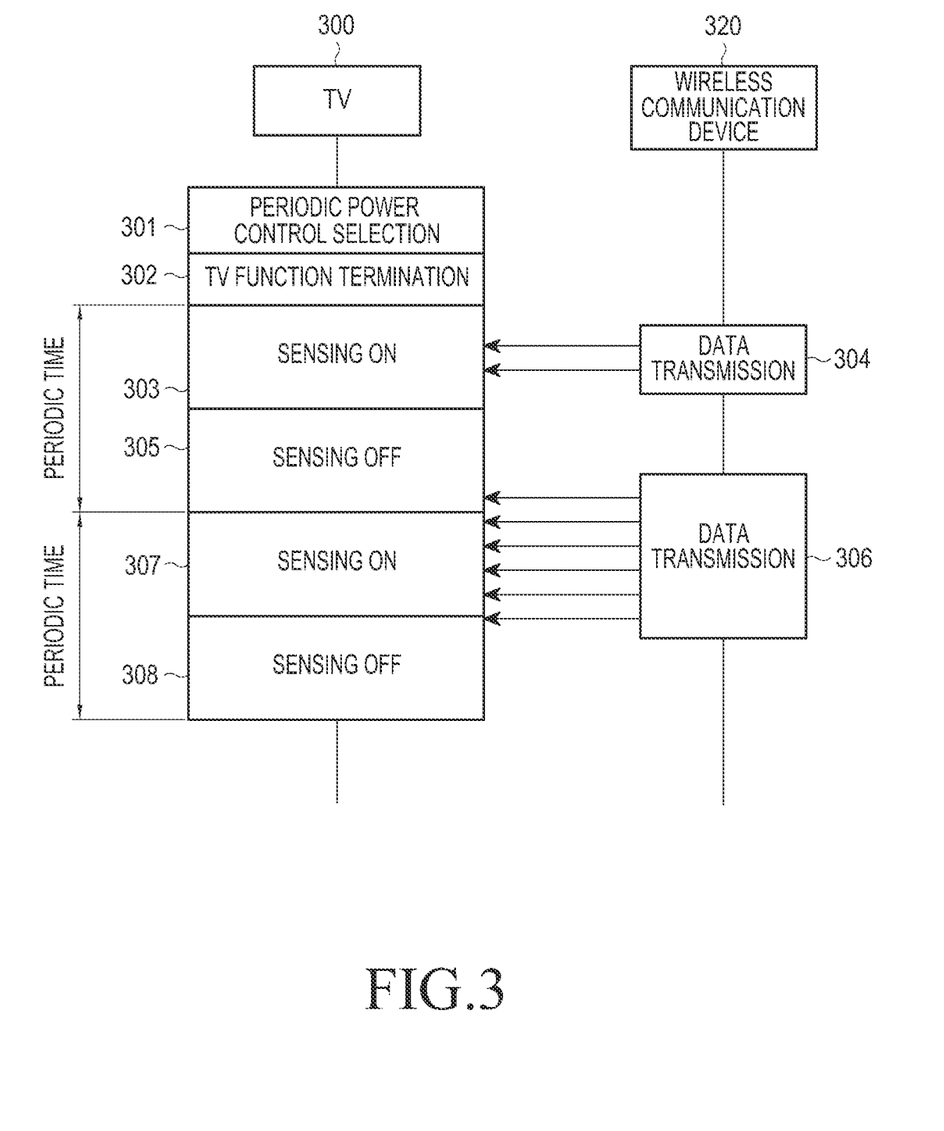
FIG. 3 is a signal flow illustrating a method for controlling power of a TV by using a periodic power control scheme in a service mode according to an embodiment of the present disclosure.

FIG. 3 is a signal flow illustrating a method for controlling power of a TV by using a periodic power control scheme in a service mode according to an embodiment of the present disclosure.

Referring to FIG. 3, if determining that a user selects the periodic power control scheme from among the three power control schemes in operation 301, a TV 300 cuts off power to the data processor 206 and the display unit 208 to terminate a TV function in operation 302. Herein, the TV 300 may set a period for receiving data from a wireless communication device 320 and displaying the received data.

The TV 300 performs a sensing-on operation according to the set period in operation 303. The sensing-on operation includes displaying the data received from the wireless communication device 320, and the sensing-on operation may be performed during a time period. For the sensing-on operation, power is supplied to the data processor 206 and the display unit 208 as well as the RF unit 200 and the memory 204 of the TV 300. Thus, the TV 300 receives the data transmitted by the wireless communication device 320 in operation 304 and displays the data on the display unit 208.

On the other hand, if the sensing-on operation time has ended, the TV 300 performs a sensing-off operation during a time period in operation 305. The sensing-off operation time may be set equal to or different from the sensing-on operation time.

The sensing-off operation cuts off power to the data processor 206 and the display unit 208 of the TV 300. In this case, power to the RF unit 200 and the memory 204 is not cut off, such that during the sensing-off operation, the TV 300 may receive data from the wireless communication device 320.

More specifically, if the wireless communication device 320 transmits data when the TV 300 is performing the sensing-off operation in operation 306, then the TV 300 receives data through the RF unit 200 and stores the received data in a buffer of the memory 204. If the sensing-on operation is performed in operation 307, the TV 300 displays the data stored in the buffer on the screen.

In this way, the TV 300 may continuously receive data from the wireless communication device 320 even if the sensing-off operation is performed in operation 308.

As such, if the periodic power control scheme is used, power is not supplied at all times to the data processor 206 and the display unit 208 that occupies the most part of power consumption of the TV 300, thereby reducing power consumption corresponding to service use. The problem of displaying corresponding data sporadically during TV watching for the periodic power control scheme may be solved, and data received from the wireless communication device 320 may be collected and displayed at a time.

Figure 4:
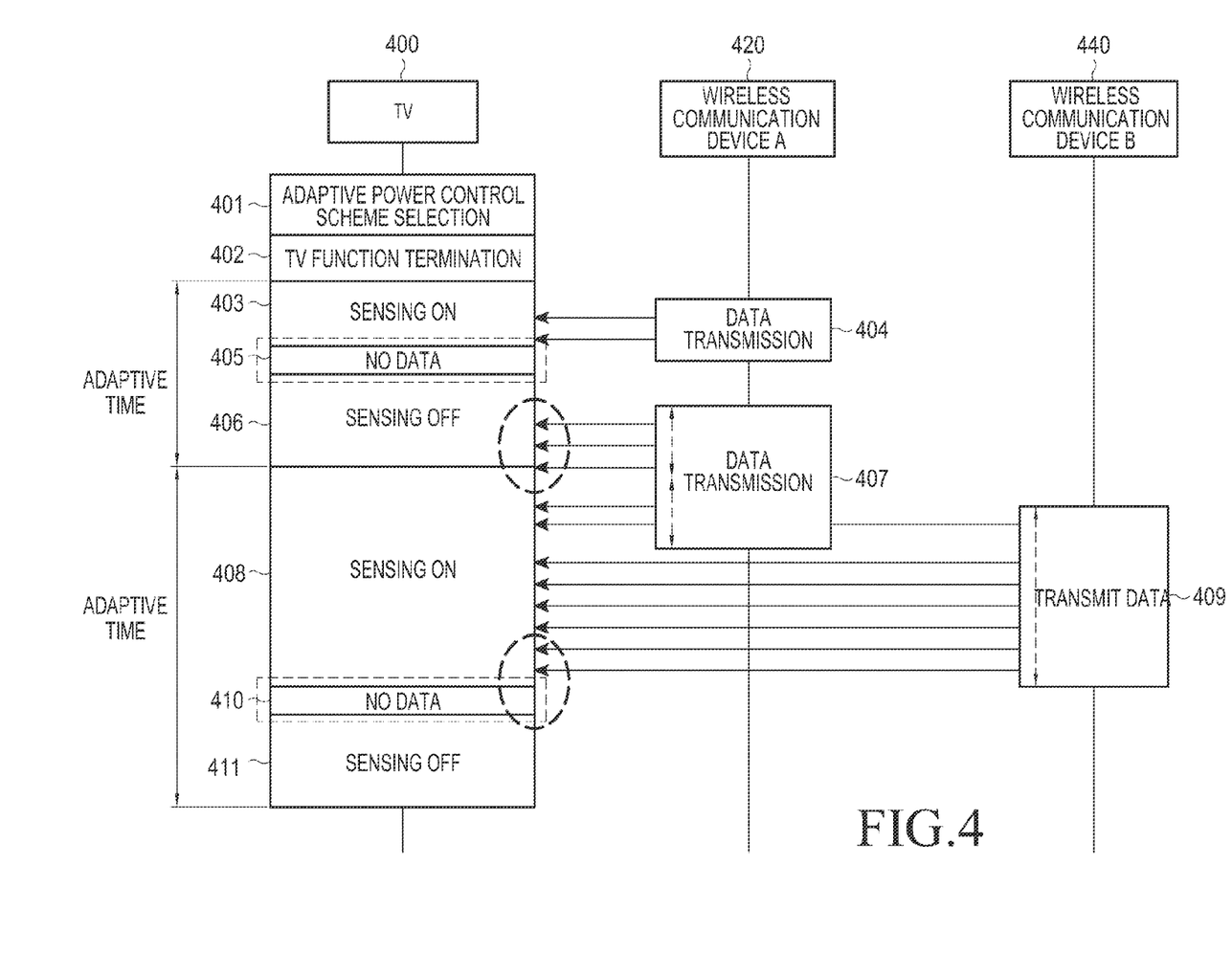
FIG. 4 is a signal flow illustrating a method for controlling power of a TV by using an adaptive power control scheme in a service mode according to an embodiment of the present disclosure.
Figure 5:
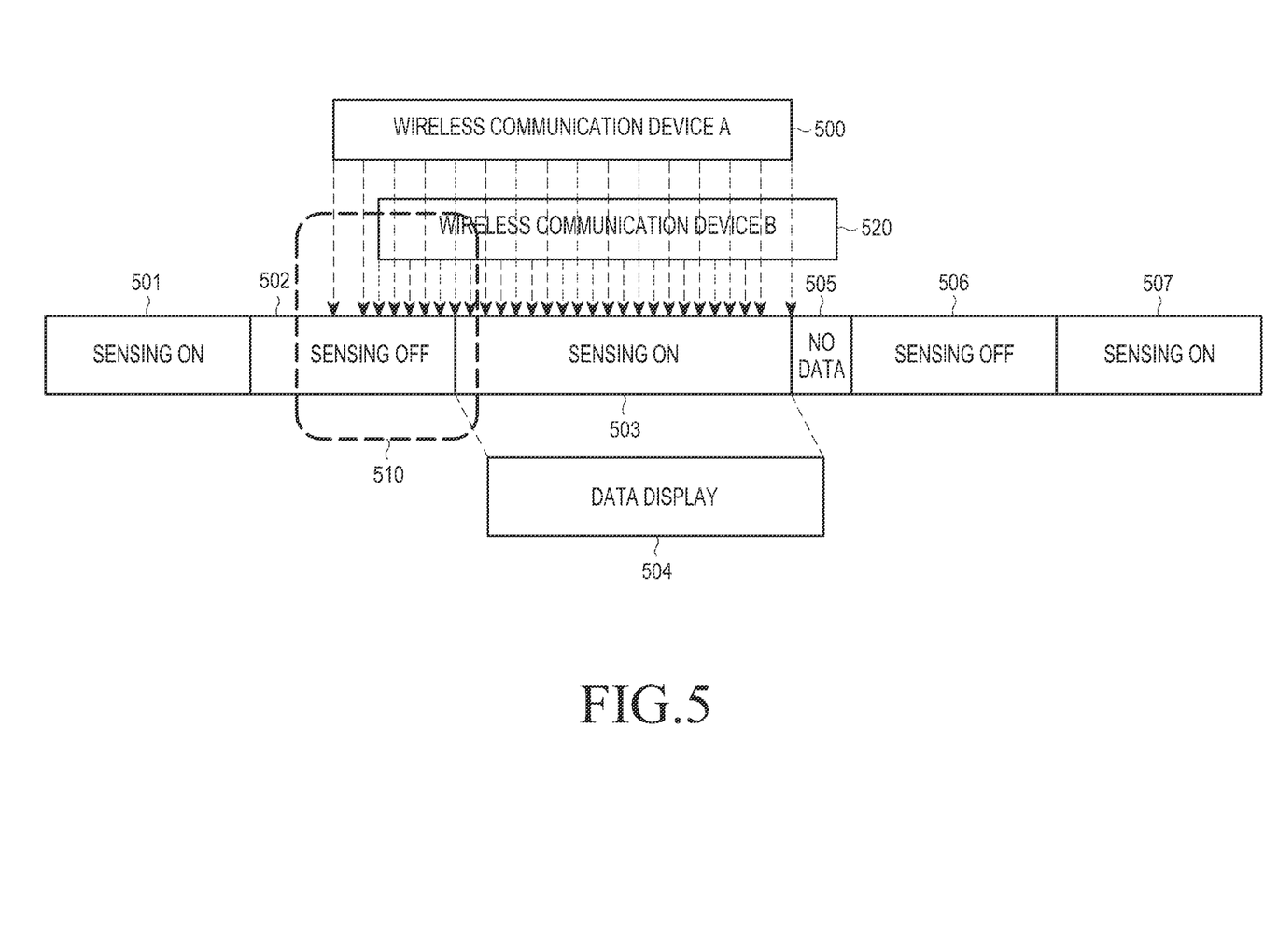
FIG. 5 is a block timing diagram illustrating an adaptive power control scheme according to an embodiment of the present disclosure.
Figure 6:
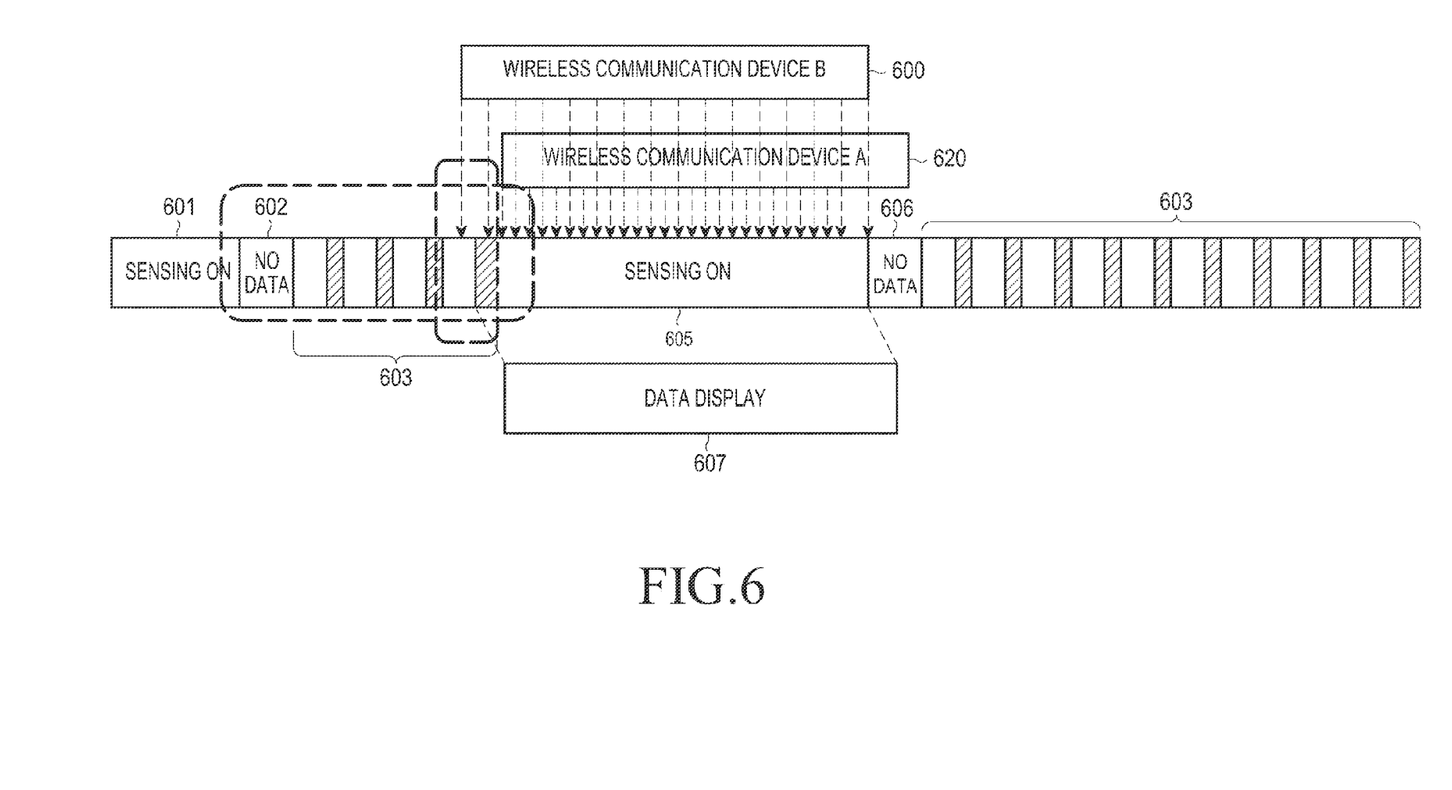
FIG. 6 is a block timing diagram illustrating an adaptive power control scheme according to another embodiment of the present disclosure.

With reference to FIGS. 4 through 6, the adaptive power control scheme will be described. The periodic power control scheme may be used when a TV receives data from one wireless communication device, but the adaptive power control scheme may be used when the TV receives data from multiple wireless communication devices.

FIG. 4 is a signal flow illustrating a method for controlling power of a TV by using an adaptive power control scheme in a service mode according to an embodiment of the present disclosure.

Referring to FIG. 4, if determining that the user selects the adaptive power control scheme from among the three power control schemes in operation 401, a TV 400 cuts off power to the data processor 206 and the display 208 to terminate a TV function in operation 402.

The TV 400 performs a sensing-on operation in operation 403. Also when the adaptive power control scheme is used, the sensing-on operation and the sensing-off operation are alternately performed like in the above-described periodic power control scheme. However, when the adaptive power control scheme is used, the sensing-on operation is terminated if data has not be received from multiple wireless communication devices for a time period.

More specifically, if a wireless communication device A 420 transmits data in operation 404 when the TV 400 is performing the sensing-on operation in operation 403, then the TV 400 receives the data. If determining that data has not be received from the wireless communication device A 420 for a time period or no data has been received from the wireless communication device B 440 for the time period in operation 405, then the TV 400 proceeds to operation 406 to perform the sensing-off operation. That is, the TV 400 cuts off power to the data processor 206 and the display unit 208 for a time in operation 406.

When the TV 400 is performing the sensing-off operation, the wireless communication device A 420 or the wireless communication device B 440 may transmit data to the TV 400. For example, if the wireless communication device A 420 transmits data in operation 407, the TV 400 receives and stores data transmitted from the wireless communication device A 420 by using the RF unit 200 and the memory 204 to which power is not cut off. The TV 400 performs the sensing-on operation in operation 408. That is, the TV 400 continues receiving the data from the wireless communication device A 420 in operation 408, and receives data transmitted in operation 409 from the wireless communication device B 440. The received data is stored in a buffer of the memory 204, and the buffer stores data received during the sensing-off operation of operation 406. Thus, the TV 400 controls the data processor 206 to process the data stored in the buffer and to display the processed data on the display unit 208.

If determining that no data has been received from the wireless communication device A 420 or the wireless communication device B 440 for a time period in operation 410, the TV 400 proceeds to operation 411 to perform the sensing-off operation.

Hereinafter, the adaptive power control scheme of FIG. 4 will be described in more detail with reference to FIG. 5.

FIG. 5 is a block timing diagram illustrating an adaptive power control scheme according to an embodiment of the present disclosure.

Referring to FIG. 5, when the adaptive power control scheme is used, if no data has been received for a time interval 501 during which the sensing-on operation is performed (hereinafter, referred to as a 'sensing-on time interval'), after an elapse of a time period, the TV enters a time interval 502 (hereinafter, a 'sensing-off time interval') during which the sensing-off operation is performed.

The RF unit 200 and the memory 204 are supplied with power at all times, regardless of the sensing-on time interval or the sensing-off time interval. Thus, the TV may receive data during a particular time interval 510 included in the sensing-off time interval 502. The received data may be stored in the buffer, and if power is supplied to the display unit 208 during a sensing-on time interval 503, the stored data is processed by the data processor 206 and displayed during a time interval 504.

The length of a sensing-on time interval varies according to the amount of received data. That is, as the amount of received data increases, the length of the sensing-on time interval also increases. The sensing-on time interval ends if no data is received from multiple wireless communication devices for a time period. Upon receiving data from a wireless communication device A 500 and a wireless communication device B 520, the TV checks a time that has elapsed from reception of the data until reception of another data. If the elapsing time exceeds a time period, the TV determines that there is no data to be displayed in a time interval 505, and performs the sensing-off operation in a time interval 506. If the sensing-off time interval having a time period interval length ends, the TV enters the sensing-on time interval again to perform the sensing-on operation in a time interval 507.

With an adaptive power control scheme according to another embodiment of the present disclosure, it may be periodically determined whether data is received from wireless communication devices during a sensing-off time interval, as will be described in detail with reference to FIG. 6.

FIG. 6 is a block timing diagram illustrating an adaptive power control scheme according to another embodiment of the present disclosure.

Referring to FIG. 6, also in this scheme, like in the adaptive power control scheme of FIG. 5, sensing-on time intervals 601 and 605 end if no data 602 and 606 has been received from multiple wireless communication devices for a time period. However, a sensing-off time interval according another embodiment of the present disclosure is different from the sensing-off time interval in the embodiment of FIG. 5.

According to another embodiment of the present disclosure, power is not supplied to the data processor 206 and the display unit 208 during a sensing-off time interval 603, but it is periodically determined if data is stored in the buffer of the memory 204. That is, during the sensing-off time interval 603, it is periodically determined whether there is data that has been received from a wireless communication device A 620 or a wireless communication device B 600.

If determining that the received data exists, the TV performs the sensing-on operation during the time interval 605 from reception of the data to display the data on the display unit 208 during a time interval 607. If determining that there is no received data, the TV continues performing the sensing-off operation. That is, the sensing-off time interval is maintained until it is determined that there is the received data, such that the sensing-off time interval increases as a time during which there is no received data increases.

The above-described adaptive power control scheme may more effectively control power of the TV and efficiently determine a display time without wasting the power, when the TV communicates with multiple wireless communication devices.

Next, a cooperative power control scheme according to an embodiment of the present disclosure will be described with reference to FIG. 7.

Figure 7:
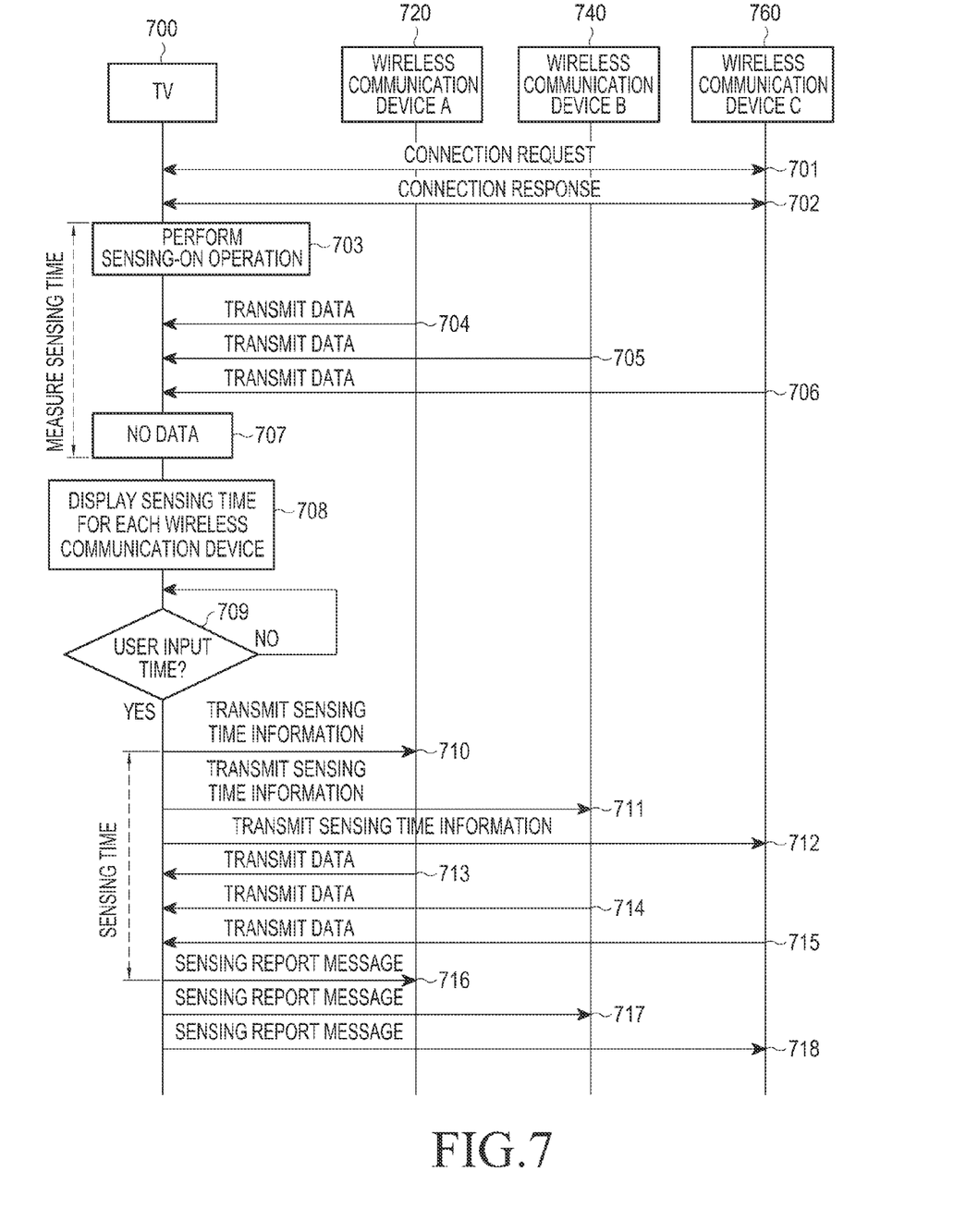
FIG. 7 is a signal flow illustrating a method for controlling power of a TV by using a cooperative power control scheme in a service mode according to an embodiment of the present disclosure.

FIG. 7 is a signal flow illustrating a method for controlling power of a TV by using the cooperative power control scheme in a service mode according to an embodiment of the present disclosure.

Referring to FIG. 7, a TV 700 transmits and receives connection requests and connection responses with a wireless communication device A 720, a wireless communication device B 740, and a wireless communication device C 760 in operations 701 and 702, thus performing a connection process with the wireless communication device A 720, the wireless communication device B 740, and the wireless communication device C 760.

The TV 700 may transmit the connection request to each of the wireless communication device A 720, the wireless communication device B 740, and the wireless communication device C 760, or each of the wireless communication device A 720, the wireless communication device B 740, and the wireless communication device C 760 may transmit the connection request to the TV 700. The TV 700 may transmit the connection response to each of the wireless communication device A 720, the wireless communication device B 740, and the wireless communication device C 760, or each of the wireless communication device A 720, the wireless communication device B 740, and the wireless communication device C 760 may transmit the connection response to the TV 700. The connection request and the connection response may be transmitted and received between the TV 700 and the wireless communication device A 720, the wireless communication device B 740, and the wireless communication device C 760.

Upon completion of the connection process, the TV 700 performs a sensing-on operation in operation 703. The TV 700 receives data from the wireless communication device A 720, the wireless communication device B 740, and the wireless communication device C 760 in operations 704, 705, and 706. Once the sensing-on operation starts, the TV 700 measures, as a sensing time, a time from the start of the sensing-on operation to absence of received data. Herein, the sensing time may be regarded as a time from reception of data from wireless communication devices to display of information corresponding to the received data.

If there is no received data during a time period in operation 707, the TV 700 displays a sensing time for each wireless communication device in operation 708. The TV 700 displays a screen on which the user may set a sensing time for each wireless communication device.

If the user inputs a time in operation 709, the TV 700 sets the input time as a sensing time. The TV 700 transmits sensing time information including sensing time start information to the wireless communication device A 720, the wireless communication device B 740, and the wireless communication device C 760 in operations 710, 711, and 712. Then, the wireless communication device A 720, the wireless communication device B 740, and the wireless communication device C 760 starts transmitting data to the TV 700 from a sensing time start point based on the received sensing time information in operations 713, 714 and 715.

Once the TV 700 displays the received data during the sensing time and the sensing time ends, the TV 700 sends a sensing report message including sensing time end information to each of the wireless communication device A 720, the wireless communication device B 740, and the wireless communication device C 760. The sensing report message is intended to indicate end of the sensing time, and each of the wireless communication device A 720, the wireless communication device B 740, and the wireless communication device C 760 terminates data transmission to the TV 700 upon receiving the sensing report message 716, 717 and 718.

While a description has been made of a process in which the TV 700 transmits sensing time start information and sensing time end information through separate messages with reference to FIG. 7, it is obvious to those of ordinary skill in the art that the TV 700 may also transmit information about a sensing time interval (that is, including the sensing time start information and the sensing time end information) through one message according to an embodiment of the present disclosure.

The amount of data transmitted in operations 704, 705, and 706 may be smaller than the amount of data transmitted in operations 713, 714, and 715, but the amount of data transmitted in each operation may be changed variously.

When the cooperative power control scheme is used, a display time is determined according to user's selection, such that the user may be provided with a corresponding service at a desired time point without being disturbed in TV watching.

Figure 8:
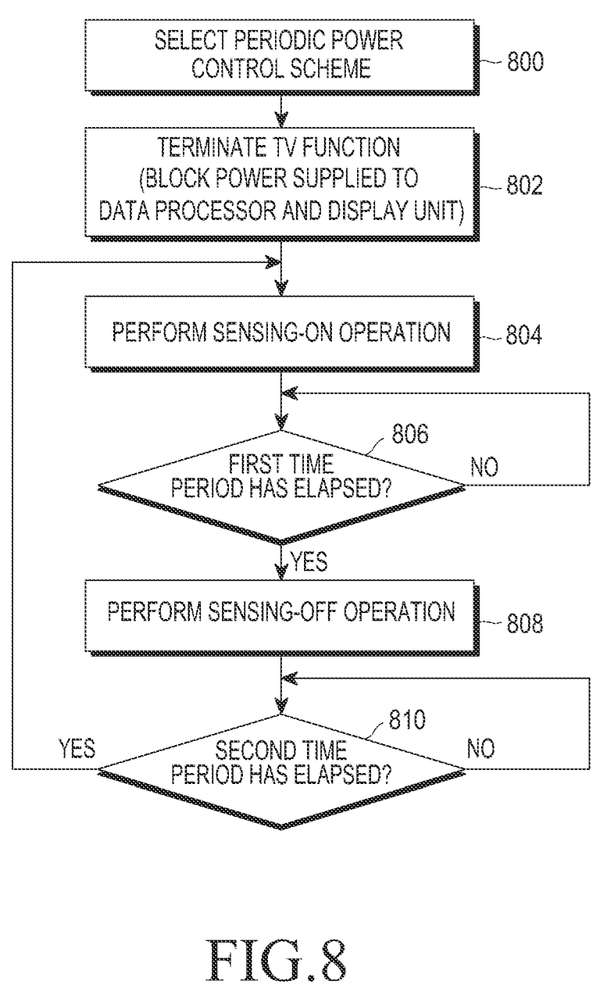
FIG. 8 is a flowchart illustrating an operating process of a TV when a periodic power control scheme is used according to an embodiment of the present disclosure.

With reference to FIG. 8, a description will be made of an operating process of a TV for the periodic power control scheme according to an embodiment of the present disclosure.

FIG. 8 is a flowchart illustrating an operating process of a TV when the periodic power control scheme according to an embodiment of the present disclosure is used.

Referring to FIG. 8, once the periodic power control scheme is selected in operation 800, the TV cuts off power to the data processor 206 and the display unit 208 to terminate a TV function in operation 802. The TV performs a sensing-on operation in operation 804 to receive data from a wireless communication device and to display information corresponding to the received data.

The TV determines whether a first time period has elapsed in operation 806. Herein, the first time period indicates a time from start of the sensing-on operation to end of the sensing-on operation.

The TV proceeds to operation 808 to perform a sensing-off operation if the first time period has elapsed. The TV determines whether a second time period has elapsed in operation 810. Herein, the second time period indicates a time from start of the sensing-off operation to end of the sensing-off operation, and the second time period may be set equal to or different from the first time period.

The TV proceeds to operation 804 to perform the sensing-on operation and a process related to the above-described sensing-on operation, if the second time period has elapsed.

Next, with reference to FIG. 9, a description will be made of an operating process of a TV when the adaptive power control scheme according to an embodiment of the present disclosure is used.

Figure 9:
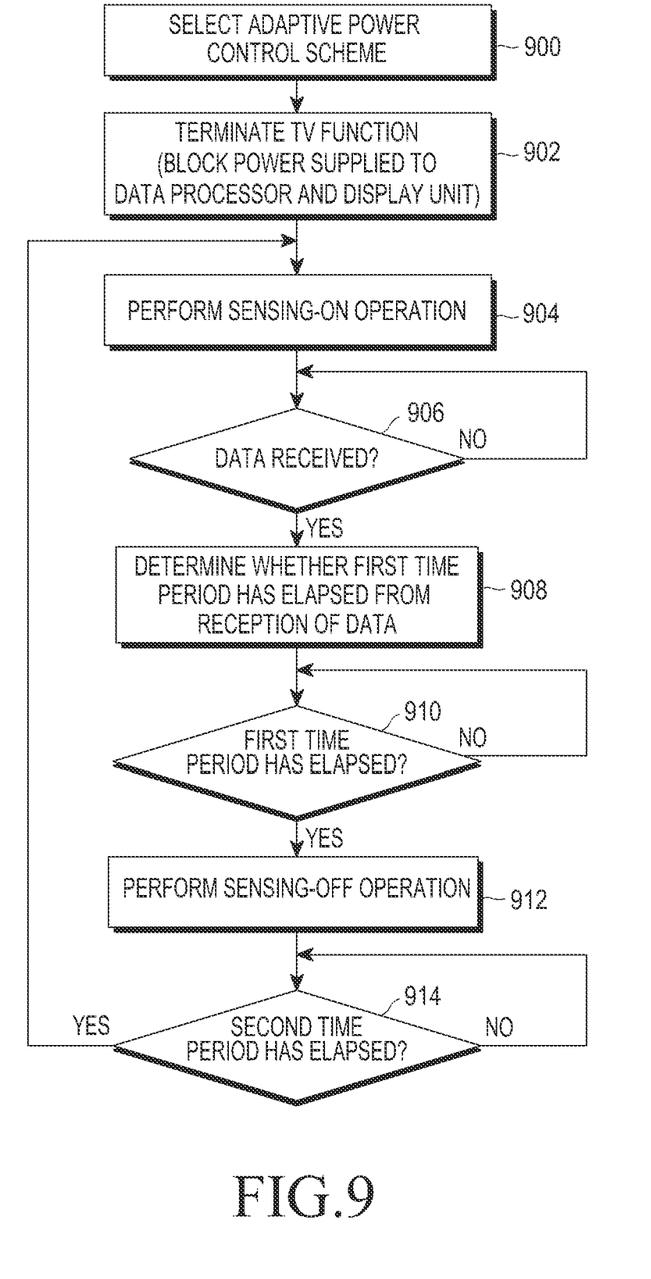
FIG. 9 is a flowchart illustrating an operating process of a TV when an adaptive power control scheme is used according to an embodiment of the present disclosure.

FIG. 9 is a flowchart illustrating an operating process of a TV when an adaptive power control scheme is used according to an embodiment of the present disclosure.

Referring to FIG. 9, if the adaptive power control scheme is selected in operation 900, the TV cuts off power to the data processor 206 and the display unit 208 to terminate a TV function in operation 902. The TV performs the sensing-on operation in operation 904.

The TV determines whether data is received from at least one of multiple wireless communication devices in operation 906. The TV proceeds to operation 908 to determine whether a first time period has elapsed from reception of the data, if the data is received. Herein, the first time period is a time used to detect that data is not received from the at least one wireless communication device, and the first time period may be preset.

The TV performs the sensing-off operation in operation 912, if the first time period has elapsed in operation 910. That is, the TV determines that no data has been received from the at least one wireless communication device, and performs the sensing-off operation. The TV determines whether a second time period has elapsed in operation 914. Herein, the second time period indicates a time from start of the sensing-off operation to end of the sensing-off operation.

If the second time period has elapsed, the TV proceeds to operation 904 to perform the sensing-on operation.

Figure 10:
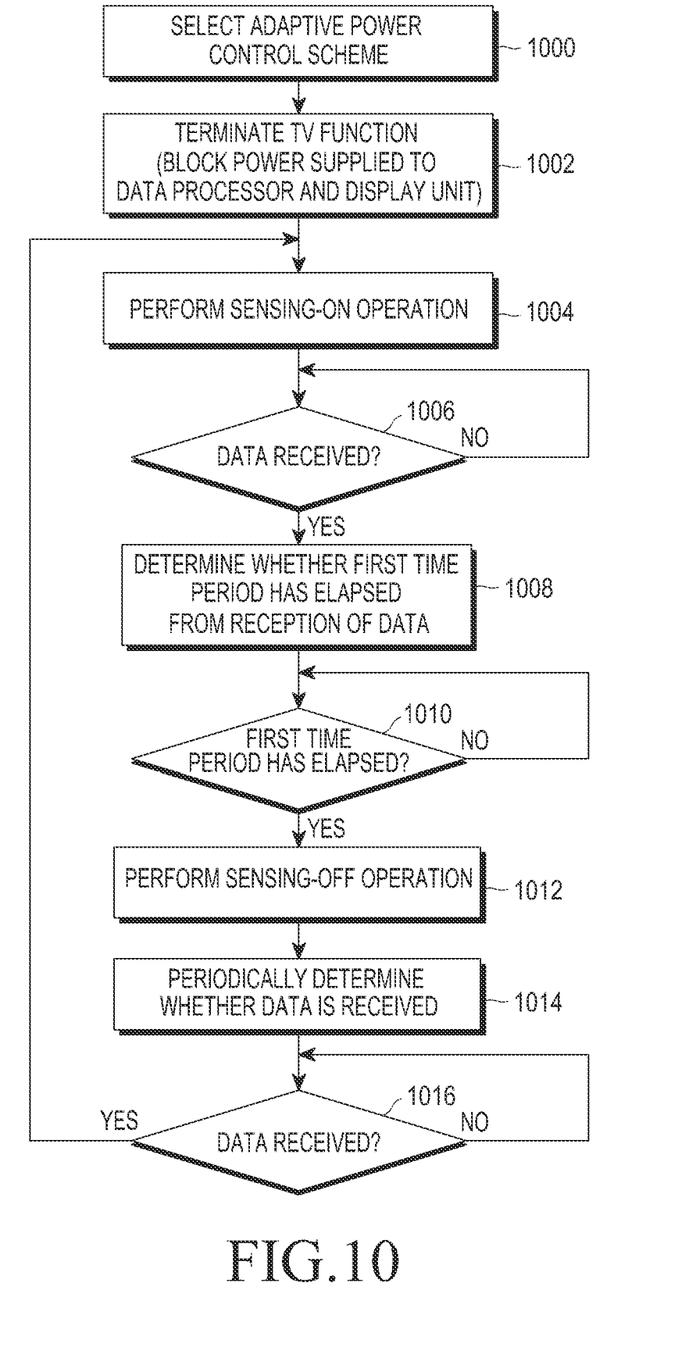
FIG. 10 is a flowchart illustrating an operating process of a TV when an adaptive power control scheme is used according to another embodiment of the present disclosure.

With reference to FIG. 10, a description will be made of an operating process of a TV when an adaptive power control scheme according to another embodiment of the present disclosure is used.

FIG. 10 is a flowchart illustrating an operating process of the TV when the adaptive power control scheme according to another embodiment of the present disclosure is used.

Referring to FIG. 10, if the adaptive power control scheme is selected in operation 1000, the TV cuts off power to the data processor 206 and the display unit 208 to terminate a TV function in operation 1002. The TV performs the sensing-on operation in operation 1004.

The TV determines whether data is received from at least one of multiple wireless communication devices in operation 1006. If the data is received, the TV proceeds to operation 1008 to determine whether a first time period has elapsed from reception of the data. Herein the first time period is a time used to detect that data is not received from the at least one wireless communication device, and may be preset.

If the first time period has elapsed in operation 1010, the TV performs a sensing-off operation in operation 1012. That is, the TV determines that data is not received from the at least one wireless communication device, and performs the sensing-off operation. The TV periodically determines whether data is received in operation 1014.

If determining that the data is received in operation 1016, the TV proceeds to operation 1004 to perform the sensing-on operation. If determining that the data is not received, the TV performs operation 1014.

Figure 11:
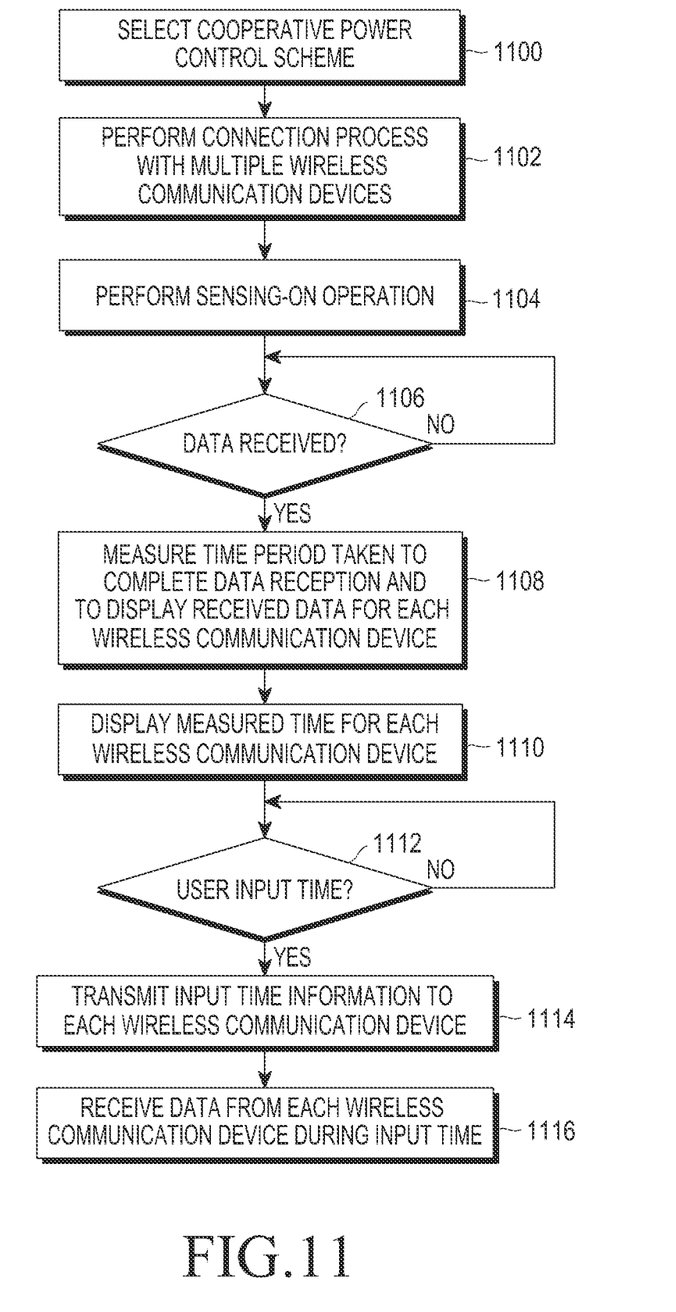
FIG. 11 is a flowchart illustrating an operating process of a TV when a cooperative power control scheme according to an embodiment of the present disclosure.

With reference to FIG. 11, a description will be made of an operating process of a TV when a cooperative power control scheme according to an embodiment of the present disclosure is used.

FIG. 11 is a flowchart illustrating an operating process of a TV when a cooperative power control scheme according to an embodiment of the present disclosure is used.

Referring to FIG. 11, if the cooperative power control scheme is selected in operation 1100, the TV performs connection with multiple wireless communication devices in operation 1002. The TV performs the sensing-on operation in operation 1104.

If receiving data from at least one of the multiple wireless communication devices in operation 1106, the TV measures a time period taken to complete data reception and display the received data for each wireless communication device in operation 1108. The TV displays the time measured for each wireless communication device in operation 1110, and if the user inputs a time in operation 1112, the TV transmits input time information to each wireless communication device in operation 1114.

The TV receives data from each wireless communication device during a corresponding input time in operation 1116.

In an embodiment of the present disclosure, wireless communication devices may be registered in a TV. The TV separately manages a list of at least one wireless communication devices to be used in the service mode and stores data for each registered wireless communication device, thereby continuously managing and using corresponding data.

Upon receiving data from a wireless communication device in the service mode, the TV determines based on a corresponding list whether the wireless communication device is a previously registered wireless communication device. If the wireless communication device is not the previously registered wireless communication device, the TV performs registration of the wireless communication device according to user's selection.

When the user desires to register the wireless communication device, the TV stores information about the wireless communication device and corresponding data. When the user does not register the wireless communication device, the TV displays information corresponding to the data and provides the information to the user without storing information about the wireless communication device and corresponding data.

While the present disclosure has been shown and described with reference to various embodiments thereof, it will be understood by those skilled in the art that various changes in form and details may be made therein without departing from the spirit and scope of the present disclosure as defined by the appended claims and equivalents thereof.

The invention claimed is:

1. A method for controlling power by a television device that is configured to communicate with at least one sensing device, the method comprising:
   storing first sensing data received from the at least one sensing device in a buffer of the television device, if the first sensing data is received while a display of the television device is deactivated;
   activating the display if a first time period is expired after the display is deactivated;
   receiving second sensing data received from the at least one sensing device;
   displaying information corresponding to the first sensing data and the second sensing data on the display; and
   deactivating the display if any sensing data is not received from the at least one sensing device during a second time period after the second sensing data is received;
   checking if third sensing data received from the at least one sensing device exists, if a television function is off; and
   maintaining the display to an activate status if the third sensing data exists.

2. The method of claim 1, further comprising:
   periodically checking whether any sensing data is received from the at least one sensing device while the display is deactivated; and
   activating the display upon reception of the any sensing data is received from the at least one sensing device while the display is deactivated.

3. The method of claim 1, wherein the first sensing data comprises health data.

4. A television device that is configured to communicate with at least one sensing device, the television device comprising:
   a display;
   a transceiver configured to receive first sensing data from the at least one sensing device;
   a memory configured to comprise a buffer to store the first sensing data, if the first sensing data is received while a display of the television device is deactivated; and
   at least one processor configured to:
   activate the display if a first time period is expired after the display is deactivated,
   receive second sensing data received from the at least one sensing device,
   display information corresponding to the first sensing data on the display, and
   deactivate the display if any sensing data is not received from the at least one sensing device during a second time period after the second sensing data is received,
   check if third sensing data received from the at least one sensing device exists, if a television function is off, and
   maintain the display to an activate status if the third sensing data exist.

5. The television device of claim 4, wherein the first sensing data comprises health data.

6. The television device of claim 4, wherein the at least one processor is further configured to:
   periodically check whether any sensing data is received from the at least one sensing device while the display is deactivated, and
   activate the display upon reception of the any sensing data received from the at least one sensing device while the display is deactivated.

* * * * *